United States Patent [19]

Yanai et al.

[11] Patent Number: 4,650,019
[45] Date of Patent: Mar. 17, 1987

[54] ELECTRICAL MOTOR TYPE POWER-STEERING SYSTEM

[75] Inventors: Tokiyoshi Yanai, Yokosuka; Masafumi Nakayama, Yamato; Yutaka Aoyama, Yokosuka; Moritsune Nakata, Yokohama, all of Japan

[73] Assignee: Nissan Motor Company, Limited, Yokohama, Japan

[21] Appl. No.: 759,845

[22] Filed: Jul. 29, 1985

[30] Foreign Application Priority Data

Jul. 30, 1984 [JP] Japan ................................ 59-159999

[51] Int. Cl.⁴ .............................................. B62D 1/20
[52] U.S. Cl. ................................ 180/79.1; 74/388 PS
[58] Field of Search ................ 180/79.1, 142; 74/425, 74/458, 388 PS

[56] References Cited

U.S. PATENT DOCUMENTS 3,820,415  6/1974  Cass ........................................ 74/498

FOREIGN PATENT DOCUMENTS 58-141963  8/1983  Japan .
59-77966   5/1984  Japan .

Primary Examiner—John L. Love
Assistant Examiner—Donn McGiehan
Attorney, Agent, or Firm—Schwartz, Jeffery, Schwaab, Mack, Blumenthal & Evans

[57] ABSTRACT

An inventive electrical motor-assisted power-steering system is compact while still providing adequate steering assist force. The system can also act as a manual steering system in the event of failure of an electrical motor. The system includes a steering gear with a shaft rotated manually via a steering shaft, a worm driven by the electrical motor operating in response to rotation of the steering shaft, and a worm wheel fixed to the steering gear shaft and meshing with the worm. The lead angle of the worm is selected to be larger than the friction angle between the worm and the worm wheel so that the worm wheel can drive the worm freely if the motor should fail.

5 Claims, 2 Drawing Figures

ELECTRICAL MOTOR TYPE POWER-STEERING SYSTEM

BACKGROUND OF THE INVENTION

1. Field of the Invention

This invention relates to electrical motor type power-steering systems and particularly to power-steering systems used in automotive vehicles.

2. Description of the Prior Art

Japanese published unexamined patent application No. 59-77966 discloses a prior art motor-assisted power-steering system. This system comprises an electrical motor with a drive gear, a gear reducer comprising a train of spur gears meshing with the drive gear, a pinion shaft constituting a lower part of a steering shaft assembly and having a final stage spur gear of the gear reducer, a rack meshing with the pinion of the pinion shaft and pivoting road wheels. The motor rotates the pinion shaft and boosts the steering force exerted by the driver according to the angular deviation from the neutral position of a steering wheel fixed to an upper part of the steering shaft assembly. In this system, the dimensions of the gear reducer necessarily increase as the reduction gear ratio increases.

Japanese published unexamined patent application No. 58-141963 discloses another prior art electrical motor-assisted power-steering gear. This power-steering gear comprises an electrical motor with a cylindrical rotor and metal core, and a planetary gear reducer comprising a sun gear rotating together with the rotor and a ring gear rotating together with a steering shaft. The motor and the planetary gear reducer are fitted onto the steering shaft. The motor rotates the steering shaft and boosts the steering efforts of the driver. In this power-steering gear, the arrangement of a planetary gear means the gear reducer will be relatively complicated and the reduction gear ratio will be relatively low.

SUMMARY OF THE INVENTION

An object of this invention is to provide a compact electrical motor-assisted power-steering system which can exert a greater steering assist force.

Another object of this invention is to provide a motor-assisted power-steering system which can also operate as a manual steering system in the event of failure of the electrical motor. In order to achieve this object, the inventive power-steering system includes a steering gear with a shaft rotated by a steering shaft, a worm driven by an electrical motor operating in response to a rotation of a steering shaft, and a worm wheel fixed to the shaft of a steering gear and meshing with the worm. The lead angle of the worm is selected to be larger than the friction angle between the worm and the worm wheel so that the worm wheel can drive the worm freely.

DESCRIPTION OF THE PREFERRED EMBODIMENTS

Figure 1:
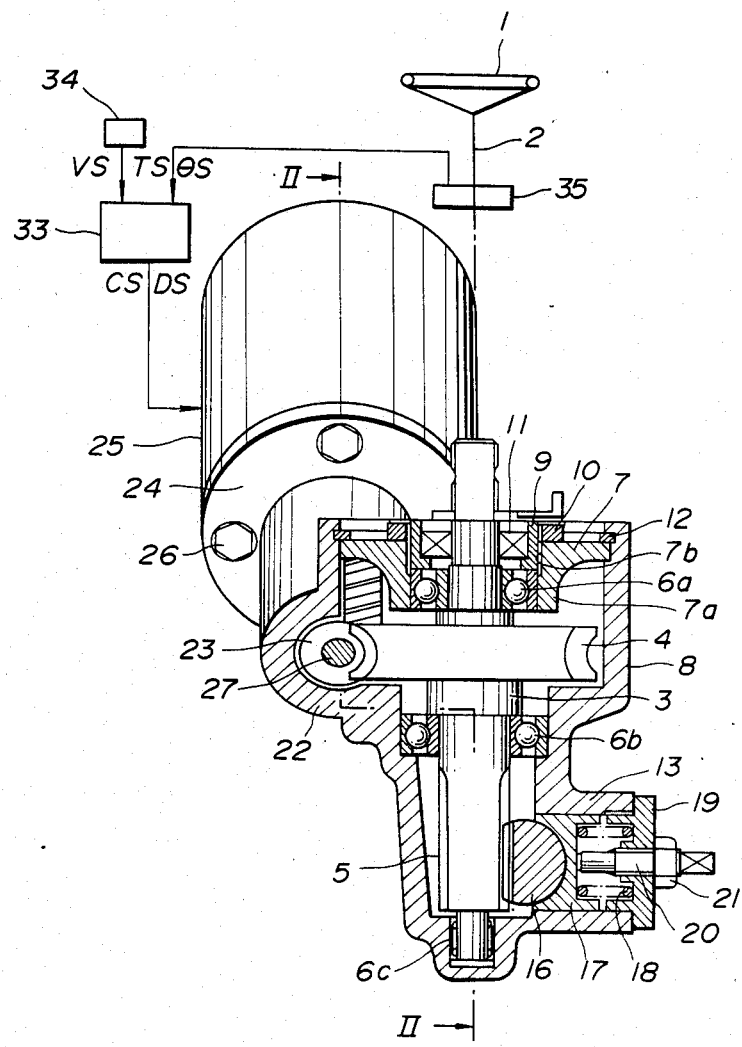
FIG. 1 is a diagram of an electrical motor-assisted power-steering system according to an embodiment of this invention.

The preferred embodiment of this invention will be described below with reference to FIGS. 1 and 2.

A steering wheel 1 is fixed to the upper end of a steering shaft 2 and a stepped pinion shaft 3 is connected to the lower end of the steering shaft 2. The pinion shaft 3 has a worm wheel 4 and a pinion 5 at its lower end. The section of the pinion shaft 3 above the worm wheel 4 is journalled within a bearing 6a in an annular lid 7 of a gear box 8. The section of the pinion shaft 3 between the worm wheel 4 and the pinion 5 is journalled within a bearing 6b installed in the gear box 8. The lower end of the pinion shaft 3 is journalled within a bearing 6c installed in the blind bottom of the gear box 8.

The lid 7 has a central boss 7a extending downwards and a central through-hole 7b. The lower half of the through-hole 7b is flat and featureless and the upper half of the through-hole 7b is threaded. The lower half of the through-hole 7b retains the bearing 6a. The upper half of the through-hole 7b threadedly receives the outer threaded surface of a cylindrical collar 9 which retains the bearing 6a axially. A locknut 10 screws onto the upper surface of the outer threaded surface of the collar 9 to clamp the lid 7 in place. An annular sliding seal 11 fits snugly between the pinion shaft 3 and the inner wall of the collar 9. The edge of the lid 7 fits into a shoulder in the upper surface of the gear box 8. A snap ring 12 engaging a recess in the inner surface of the gear box 8 holds the lid 7 in place axially.

Figure 2:
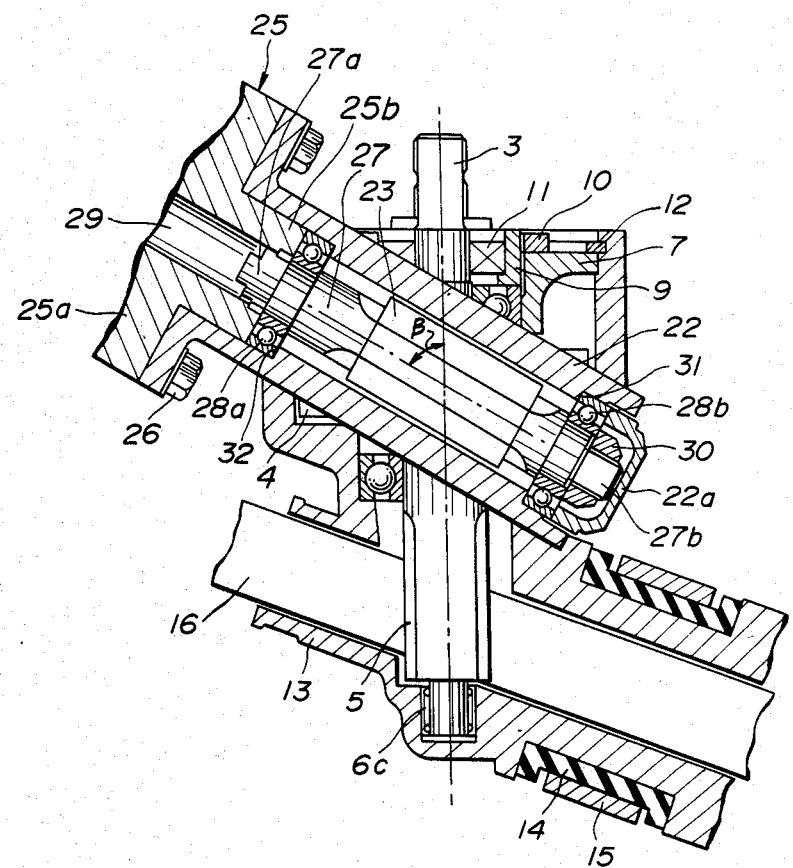
FIG. 2 is a section taken along the line II—II in FIG. 1.

The gear box 8 includes a rack housing 13, the axis of which lies oblique to and offset from the axis of the pinion shaft 3 as shown in FIG. 2. The rack housing 13 is fixed to the vehicular body (not shown) by way of a mounting bumper 14 and a clamp bracket 15 gripping the outer surface of the rack housing 13, as shown in FIG. 2.

A rack 16 which actuates the road wheels is housed within the rack housing 13 and meshes with the pinion 5 of the pinion shaft 3. As shown in FIG. 1, the rack 16 has an incomplete-circular cross-section. The smooth rear surface of the rack 16 is received by a rack retainer 17 housed within the rack housing 13. The rack retainer 17 is urged into contact with the rear surface of the rack 16 by springs 18. The outer ends of the springs 18 seat on the inner surface of a plurality of retainer covers 19 (only one shown in FIG. 1) screwed into the rack housing 13. The retainer covers 19 are arranged along the axis of the rack housing 13. Each retainer cover 19 has an adjusting screw 20 threaded through its center which abuts the rear surface of the rack retainer 17. Locknuts 21 screwed down against the retainer covers 19 hold the adjusting screws 20 in place. The adjusting screws 20 serve to offset bending forces applied to the rack 16.

The gear box 8 also includes a semicylindrical worm housing 22, the axis of which lies oblique to and offset from the axis of the pinion shaft. The lower end of the inner wall of the worm housing 22 is threaded and closed by a threaded cap 22a. The upper end of the worm housing 22 has a flange 24. A housing 25a of an electrical motor 25 such as a pulse motor is fixed to the flange 24 by means of bolts 26.

The pinion shaft 3, the pinion 5, the gear box 8 and the rack 16 form the major parts of a steering gear SG.

A worm 23 meshing with the worm wheel 4 is housed within the worm housing 22. The worm 23 is rigidly fixed to its shaft 27, the opposite ends 27a and 27b of which are journalled by bearings 28a and 28b retained within the worm housing 22 as shown in FIG. 2. The upper end 27a of the shaft 27 rigidly engages the drive shaft 29 of the motor 25. The lower end 27b of the shaft 27 is threaded. A nut 30 is screwed onto the lower end 27b of the shaft 27 to clamp the bearing 28b onto an annular shoulder 31 in the inner wall of the worm housing 22. A central boss 25b of the motor housing 25a projects into the worm housing 22 and clamps the bearing 28a onto an annular shoulder 32 in the inner wall of the worm housing 22.

The relationship between the lead angle $\alpha$ (not shown) the worm 23 and the friction angle $\beta$ (FIG. 2) between the tooth surfaces of the worm 23 and the worm wheel 4 is specified to satisfy the expression $\alpha > \beta$ so that the worm wheel 4 can drive the worm 23 if need be.

The output and the direction of rotation of the motor 25 are respectively controlled by a motor drive signal DS and a rotation direction signal CS, both from a controller 33. The controller 33 sends the motor drive signal DS to a motor output control circuit (not shown) in order to move the motor 25 to a desired position and sends the rotation direction signal CS to a motor rotation direction switch circuit (not shown) in order to switch the direction of rotation of the motor 25 in accordance with the desired steering direction.

The controller 33 is, for example, a microcomputer comprising input and output interfaces, a central processing unit and memory units. The controller 33 is connected to a vehicular speed sensor 34 and a steering condition sensor 35. The vehicular speed sensor 34 monitors vehicular speed, for example from the rotation speed of an output shaft of a transmission and sends the controller 33 a vehicular speed signal VS with a pulse frequency proportional to the vehicular speed. The steering condition sensor 35 is, in this example, mounted on the steering shaft 2. The steering condition sensor 35 sends the controller 33 various steering condition signals such as a steering torque signal TS with a pulse width related to steering torque and a steering angular deviation signal $\theta$S with a pulse frequency proportional to the angular velocity of the steering wheel.

The operation of the power-steering system of this invention will be described in detail below.

While driving straight ahead, the steering wheel 1 and the steering shaft 2 are in their neutral position, so that the steering condition sensor 35 does not output any steering torque signal TS or steering steering angular deviation signal $\theta$S pulses. Thus, the controller 33 does not output either the motor drive signal DS or the rotation direction signal CS to the motor 25, so that the motor 25 does not operate.

When the steering wheel 1 is turned slightly to the right or left, the controller 33 still does not output control signals DS or CS to actuate the motor 25 since the levels of the steering condition signals from the steering condition sensor 35 are still very low. The steering shaft 2 transmits a weak manual steering torque to the pinion shaft 3, so that the rotation of the pinion shaft 3 moves the rack 16 slightly in the direction corresponding to the desired steering direction without assistance from the motor 25. During this movement, the worm wheel 4 rotates the worm 23 freely.

When the steering wheel is turned further to the right or left, the steering condition sensor 35 outputs both a steering torque signal TS and a steering angular deviation signal $\theta$S, so that the controller 33 outputs a motor drive signal DS and a rotation direction signal CS in response to the steering torque signal TS and the steering angular deviation signal $\theta$S and a vehicular speed signal VS from the vehicular speed sensor 34, and the steering shaft 2 transmits the manual steering torque to the pinion shaft 3.

In this case, the motor 25 is driven in the corresponding direction to rotate the worm 23 and the worm wheel 4. Thus, the motor 25 exerts an assisting force on the pinion shaft 3 which does most of the work of steering. The boosted steering torque transmitted to the rack 16 through the pinion shaft 3 pivots the road wheels in the desired direction.

On the other hand, if the motor 25 becomes inoperative due to failure of the electrical circuitry of the motor 25, the power-steering system of this invention can still operates as a manual steering system since the worm wheel 4 can rotate the worm 23 freely.

In this embodiment of this invention, since the axes of the worm 23 and the worm wheel 4 are oblique to each other, it is possible to reduce the diameter of the worm 23 by increasing the lead angle $\alpha$ of the worm 23 as well as to employ a worm with a greater number of leads in order to increase the strength and durability of the worm 23.

In addition, since the worm 23 lies essentially parallel to the rack 16, the motor 25 is more compactly mounted on the gear box 8 than in conventional power-steering systems, thus allowing the power-steering gear to be more compact.

What is claimed is:

1. An electrical motor type power-steering system, comprising:
    a steering gear comprising a steering shaft and a pinion shaft rotatably connected to said steering shaft;
    an electrical motor for applying a steering assist force to said pinion shaft in response to manual rotation of said steering shaft;
    a toothed worm having a longitudinal axis and driven by said electrical motor, the teeth of said worm having a lead angle; and
    a toothed worm wheel having a longitudinal axis, said worm wheel being fixed to said pinion shaft for rotation therewith and for meshing with said worm, the axis of said worm being oblique to the axis of said worm wheel so as to form a friction angle between the meshed tooth surfaces of said worm and worm wheel, and wherein
    said lead angle of said worm is larger than said friction angle so that said worm wheel can drive said worm when said electrical motor is inoperative.

2. A power-steering system as recited in claim 1, wherein said steering gear comprises a rack and a pinion meshing with each other, the rack steering road wheels as it moves and the pinion being integral with said steering gear.

3. A power-steering system as recited in claim 1, wherein said electrical motor has a drive shaft and said worm has a worm shaft coupled coaxially with the drive shaft.

4. A power-steering system as recited in claim 2, wherein said steering gear includes a gear box with a worm housing for the worm and a rack housing of the rack, and the worm and the rack lie in planes parallel to a plane through the axis of said steering shaft.

5. A power-steering system as recited in claim 4, wherein said electrical motor has a motor housing and a drive shaft and said worm has a worm shaft coupled coaxially with the drive shaft, the motor housing being fixed to the worm housing and the worm and the rack lying substantially parallel.

* * * * *